United States Patent [19]

Mears

[11] Patent Number: 5,069,495

[45] Date of Patent: Dec. 3, 1991

[54] DEVICE FOR LIFTING BOARDS

[76] Inventor: Denis P. Mears, 20A Ravenscroft Rd., Beckenham, Kent BR34TR, United Kingdom

[21] Appl. No.: 453,608

[22] Filed: Dec. 20, 1989

[30] Foreign Application Priority Data

Dec. 21, 1988 [GB] United Kingdom ............... 8829773

[51] Int. Cl.⁵ .................... B65G 7/12; B66F 11/00
[52] U.S. Cl. .................................. 294/15; 294/26
[58] Field of Search ............... 294/15, 17, 19.1, 26, 294/34, 169; 254/2 R, 113, 119, 129–131, 133 R, 134; 280/47.12, 47.21, 47.27–47.29, 47.34, 47.35, 47.371; 414/10, 11, 427, 458, 490

[56] References Cited

U.S. PATENT DOCUMENTS

| | | | |
|---|---|---|---|
| 139,029 | 5/1873 | Smith | 294/15 X |
| 797,186 | 8/1905 | Dowlen | 294/26 X |
| 1,570,342 | 1/1926 | Dresser | 254/130 |
| 2,274,918 | 3/1942 | Chenette | 294/15 |
| 2,359,016 | 9/1944 | Wood | 414/458 X |
| 2,428,941 | 10/1947 | Packard | 294/26 X |
| 2,450,690 | 10/1948 | Robins | 414/458 |
| 2,473,873 | 6/1949 | Fosbender | 254/2 R X |
| 2,521,819 | 9/1950 | Baer | 414/458 X |
| 2,739,007 | 3/1956 | Rauterberg | 294/15 |
| 2,854,245 | 9/1958 | Manahan | 280/47.29 |
| 2,930,583 | 3/1960 | Noe et al. | 294/15 X |
| 3,007,710 | 11/1961 | Sykes | 280/47.29 X |
| 3,093,387 | 6/1963 | O'Neill | 280/47.12 |
| 3,370,725 | 2/1968 | Jones | 254/2 R X |
| 3,806,181 | 4/1974 | Blackwelder | 294/15 |
| 4,098,442 | 7/1978 | Moore | 294/26 X |
| 4,119,250 | 10/1978 | Brutlag | |
| 4,135,655 | 1/1979 | Brown | 294/34 X |
| 4,177,911 | 12/1979 | Griffin | 294/15 X |
| 4,235,355 | 11/1980 | Henry et al. | |
| 4,463,977 | 8/1984 | Wyatt | 294/26 |
| 4,630,838 | 12/1986 | Stockton | 294/15 X |
| 4,695,085 | 9/1987 | Cassels | 294/15 |

FOREIGN PATENT DOCUMENTS

| | | |
|---|---|---|
| 3640061 | 11/1986 | Fed. Rep. of Germany . |
| 1200132 | 4/1968 | United Kingdom . |
| 1418416 | 4/1973 | United Kingdom . |
| 2155319 | 2/1985 | United Kingdom . |
| 2171352 | 2/1986 | United Kingdom . |

Primary Examiner—Johnny D. Cherry
Attorney, Agent, or Firm—Davis, Bujold & Streck

[57] ABSTRACT

A hand held device for lifting boards such as a sheet or door comprising a support (1) for placing under the edge (5) of the board to be lifted, a body portion (2,3) attached to the support (1) and extending upwardly therefrom and a handle (4) attached to the upper end of the body portion (2,3) for lifting the device so that the board may be carried via the device by an operator. The device further includes a foot mechanism having a foot portion which may be extended from a lower end of the device to engage the ground and a holding mechanism for releasably holding the device in a stable raised position on the extended foot portion and at a desired height and a desired angle wherein the height and the angle of the support relative to the ground are infinitely variable.

15 Claims, 12 Drawing Sheets

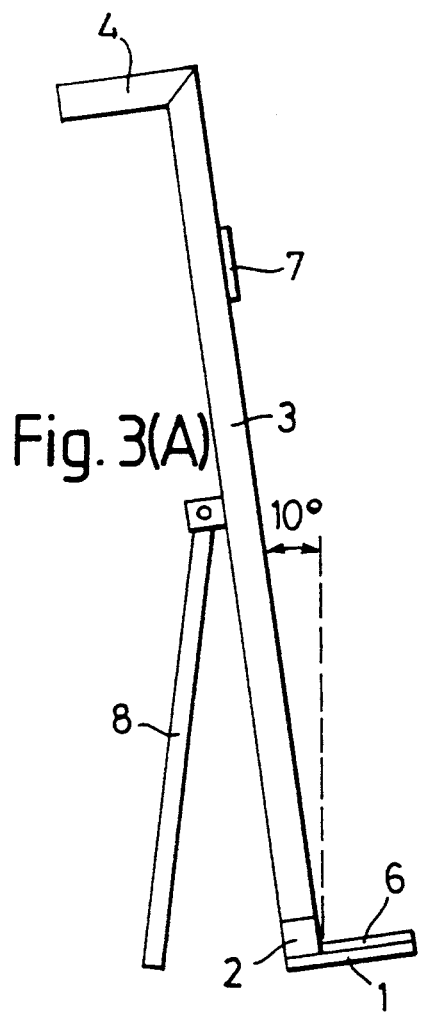
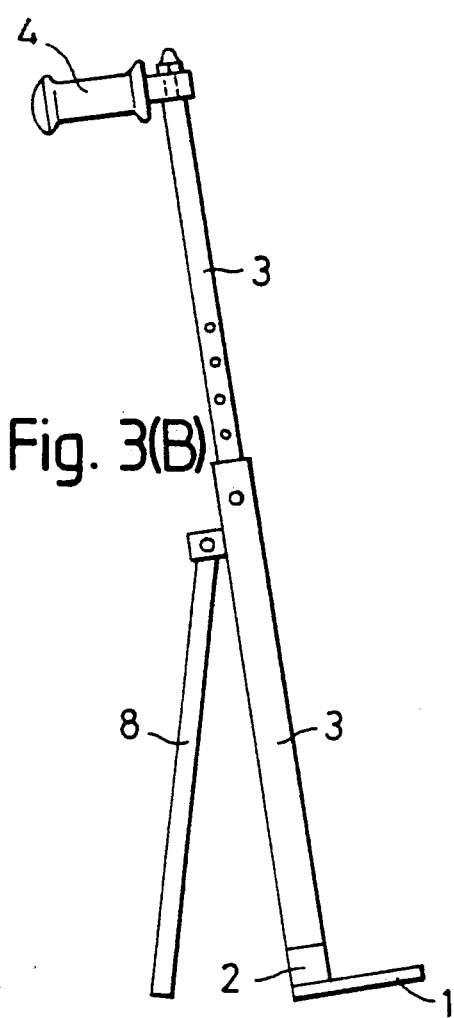
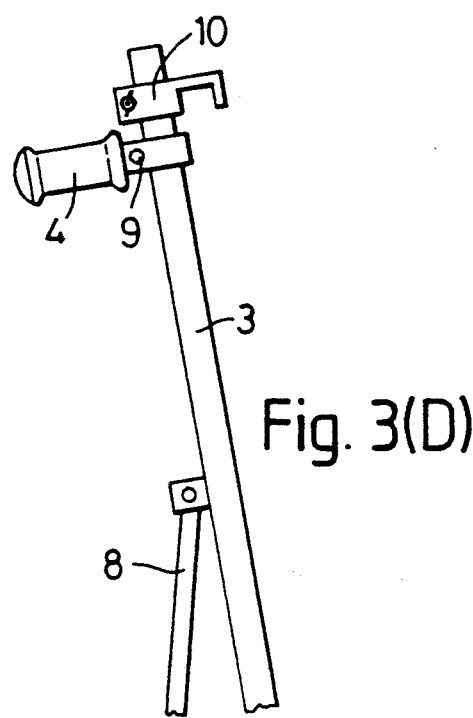
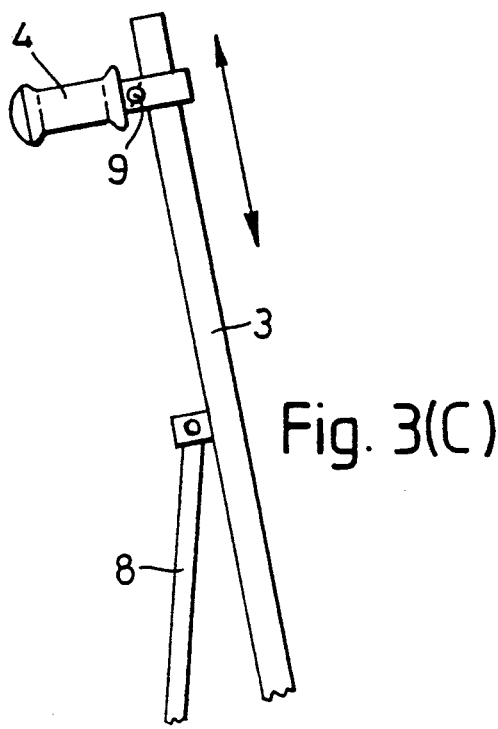

DEVICE FOR LIFTING BOARDS

This invention relates to a hand-held device for lifting a board or similar shaped article, particularly doors.

Carpenters and DIY builders frequently need to lift and carry around large boards such as plaster boards, kitchen worktops, 8'×4' (2.4 m × 1.2 m) sheets of wood and other similar shaped articles such as doors. Due to their size, and in some cases weight, it is difficult for such boards or articles to be carried by one person. If they can be carried by one person, then this needs two hands and usually requires the person to stretch into an awkward position. This means the person does not have a hand free, e.g. for opening doors, and risks sustaining muscle injuries. In addition, the article being carried is liable to be damaged or to damage other items since it is difficult to maneuver and must be put down whenever a door needs to be opened or closed.

Although these problems have existed for a long time and are experienced by many carpenters and people undertaking DIY work, the applicant is unaware of any proposals or devices available on the market for overcoming these difficulties.

The present invention aims to alleviate many of these problems by providing a hand-held device for lifting a board or similar shaped article comprising: support means for placing under the edge of the board to be lifted; a body portion attached to the support means and extending upwardly therefrom; and a handle portion attached to the body portion at a position spaced from the support means for gripping and lifting the device by hand, the arrangement being such that, in use, a board may be lifted in a substantially upright position with one edge resting on the support means and a face lying or leaning against part of the body portion with the handle portion positioned so that it can be freely gripped to lift the device without interference from the board mounted thereon so the device may be lifted and suspended from the hand.

Preferred features of the invention will be apparent from the following description and from the subsidiary claims of the specification.

The invention will now be described, merely by way of example, with reference to accompanying drawings, in which:

FIG. 1 is a perspective view of a basic form of a device according to an embodiment of the invention;

FIGS. 2(A) and 2(B) illustrate the device being used to carry an 8'×4' (2.4 m × 1.2 m) sheet and a door;

FIGS. 3(A)-3(D) are side views of optional features which may be provided on the device shown in FIG. 1;

FIG. 4 is a plan view of a handle which may be used in a preferred form of the device shown in FIG. 1;

FIGS. 5(A) and 5(B) are perspective and side views of an alternative form of the optional feature shown in FIG. 3(D);

Figure 8A:
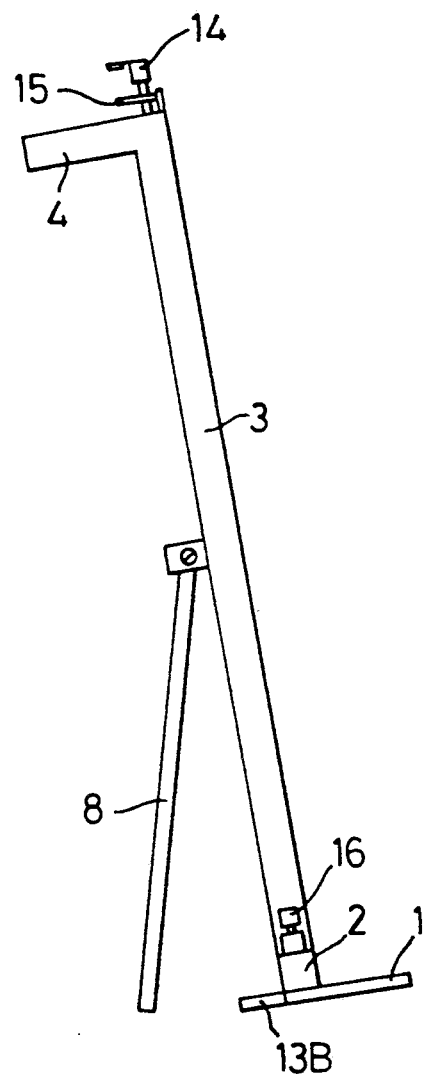
Figure 8B:
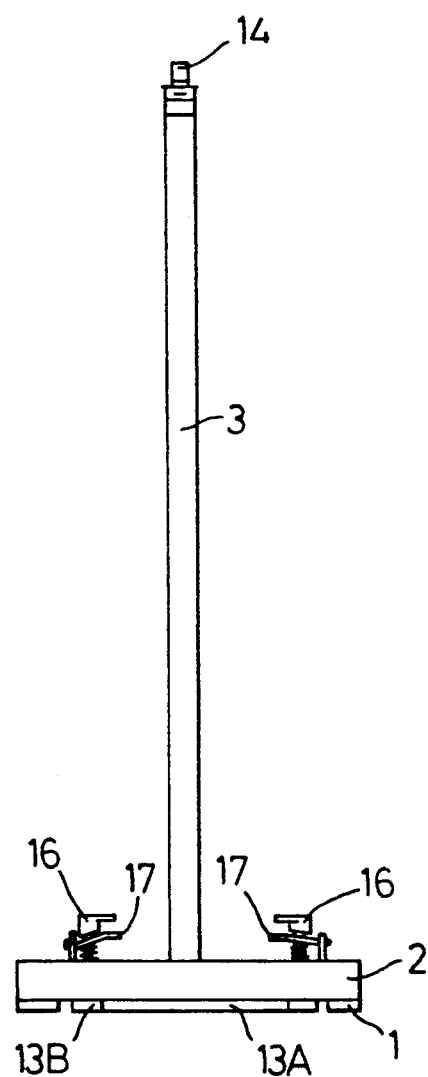
Figure 10:
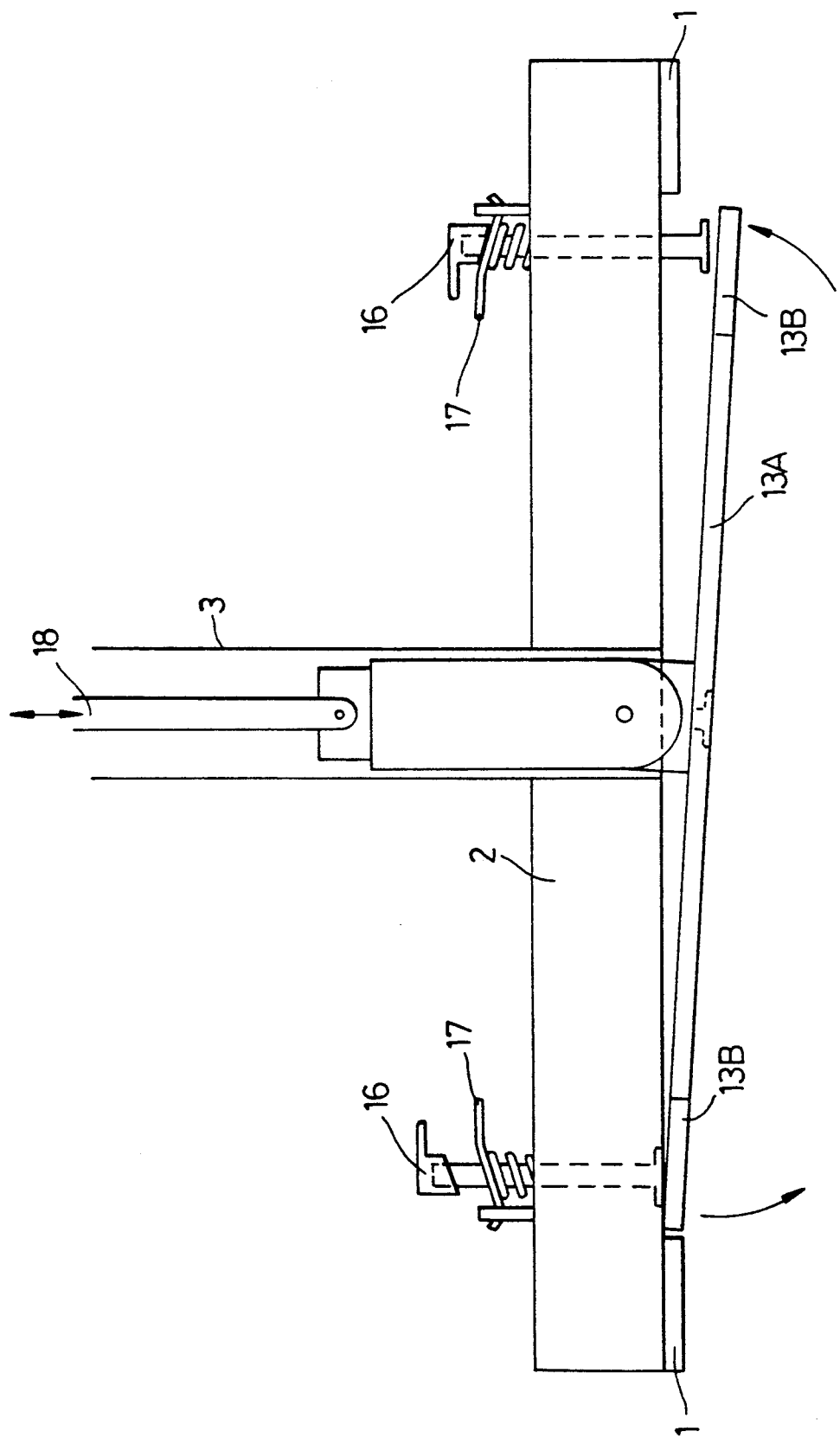
Figure 11A:
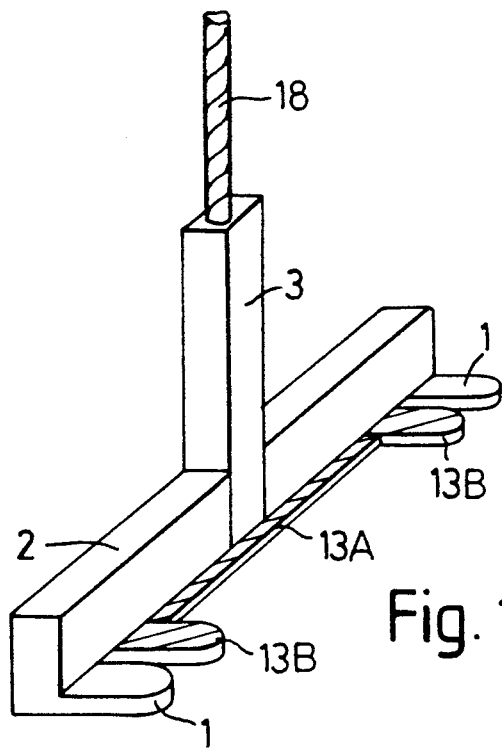
Figure 11B:
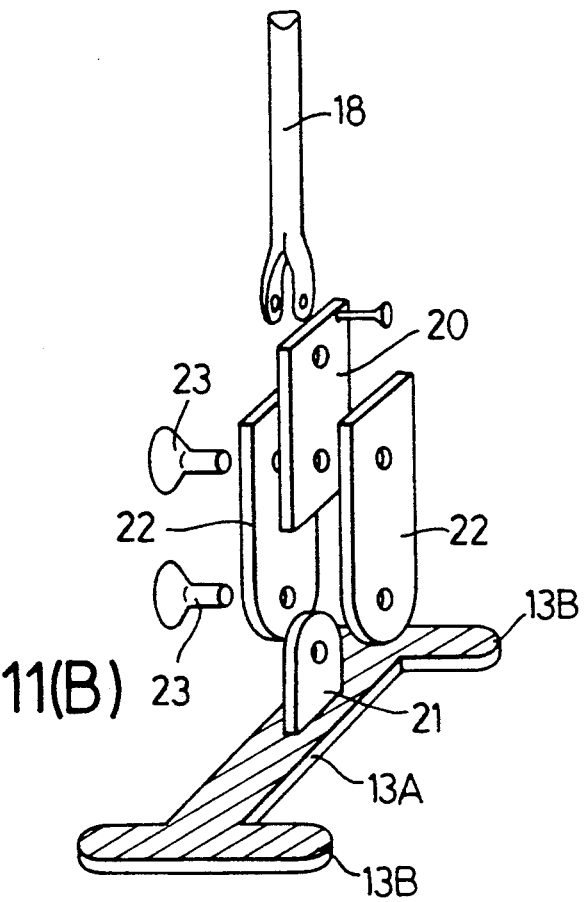
Figure 12B:
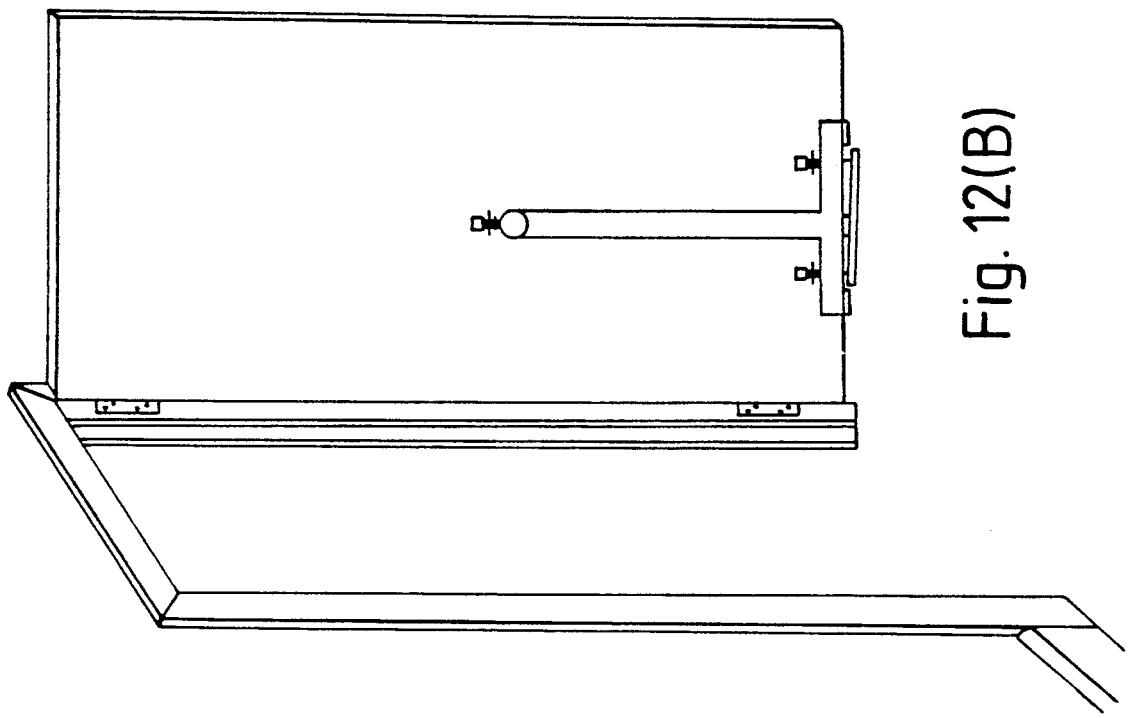
Figure 12A:
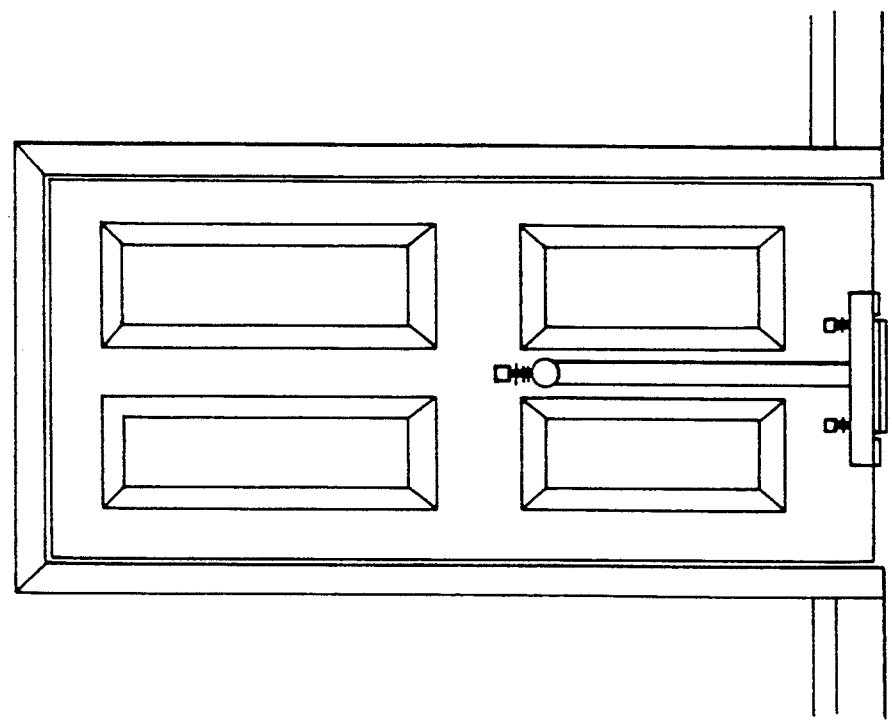

FIGS. 8(A) and 8(B) are side and front views of a preferred embodiment of a device according to the invention;

FIGS. 9(A), 9(B) and 9(C), FIG. 10 and FIGS. 11(A) and 11(B) show more detailed views of various parts of the device shown in FIG. 8; and FIGS. 12(A) and 12(B) illustrate the use of such a device in fitting a door within a door frame.

Figure 1:
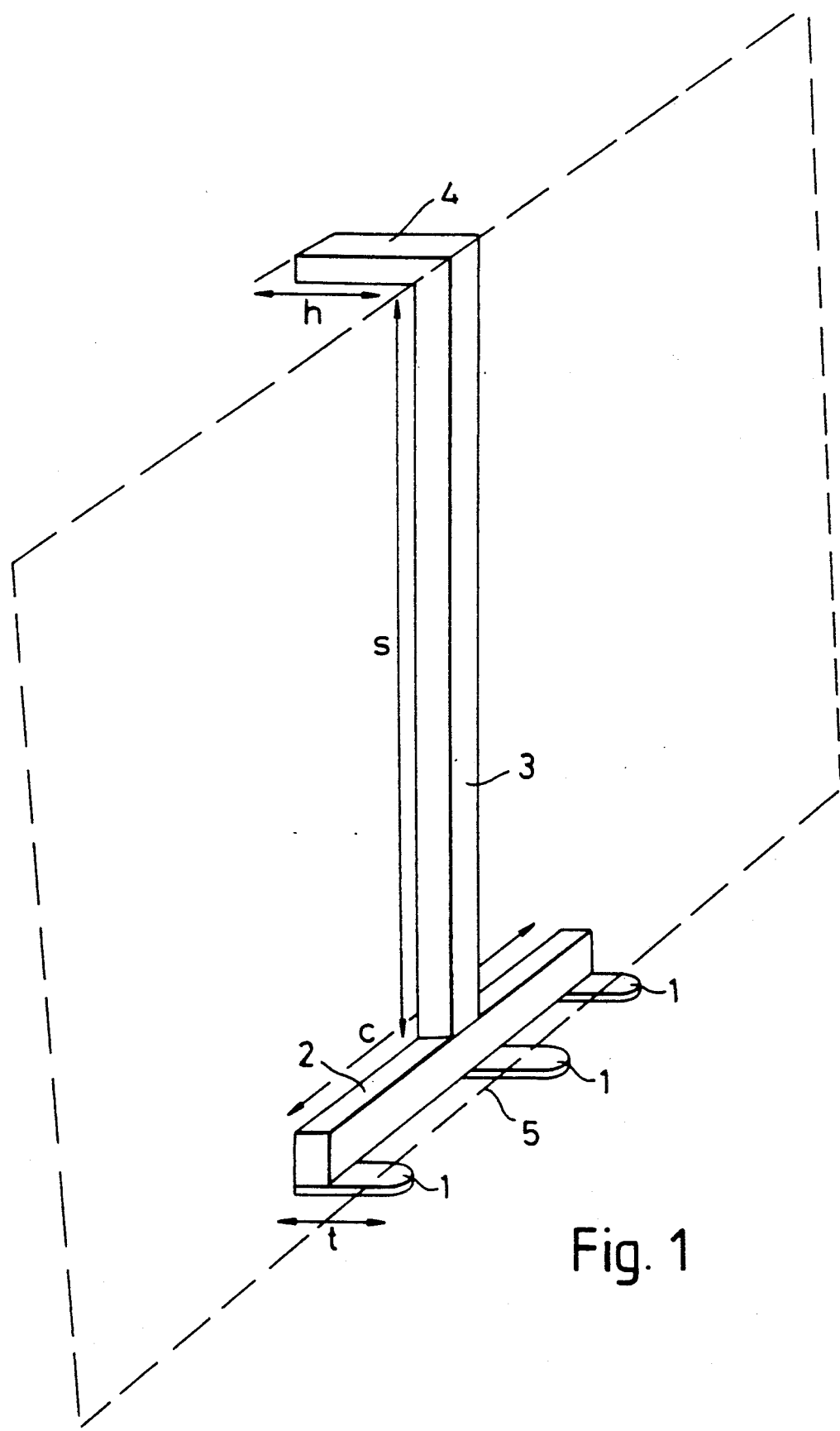

FIG. 1 shows a basic form of an embodiment of the invention. The device shown comprises support means in the form of three tines 1, a body portion comprising a cross-piece 2 to which the tines 1 are connected, a stem 3 secured to the centre of the cross-piece 2 and a handle portion comprising a hand grip 4 extending outwardly from the upper end of the stem 3 of the body portion. The hand grip 4 extends at right angles to the stem 3 in a direction opposite to that in which the tines 1 extend from the cross-piece 2 and the hand grip is positioned substantially above the centre of gravity of the device.

In use, the device is stood on the floor and a board or other article (shown by dotted lines in FIG. 1) is supported on the device with an edge 5 resting on the tines 1 and a face lying adjacent to or leaning against the stem 3. The hand grip 4 can then be taken in the hand to lift the device and the board supported thereon. The board should, of course, be positioned so that its centre of gravity lies between the outermost tines and is preferably positioned so that it is evenly balanced on the tines. By positioning the bottom edge 5 of the board slightly away from the cross-piece 2, the board will lean in towards the stem 3 rather than falling away from the stem 3 when the device is lifted. The board is thus sufficiently securely mounted on the device to be lifted by holding and lifting the hand grip 4 in one hand and the device can be carried and suspended from the hand. Although this is a very simple device, it is found to provide a remarkably secure means of holding and lifting an article such as a door or a 8'×4' (2.4 m × 1.2 m) sheet of wood. The device can be used for carrying a wide range of articles of different sizes and weights and as the articles are supported from beneath this can be done without the need for any clamps which may grip and damage the article.

It will be apparent that as the hand grip 4 extends away from the body portion in the opposite direction to the tines 1, it can be freely gripped without interference from the board which rests on the tines 1 and leans towards the stem 3. With an arm extending downwards by the side of the person carrying the device, the hand grip 4 can be held so that the device is suspended from the hand with the stem 3 parallel to the person's leg and the cross-piece 2 extending backwards and forwards relative to the person.

Figures 2A, 2B:
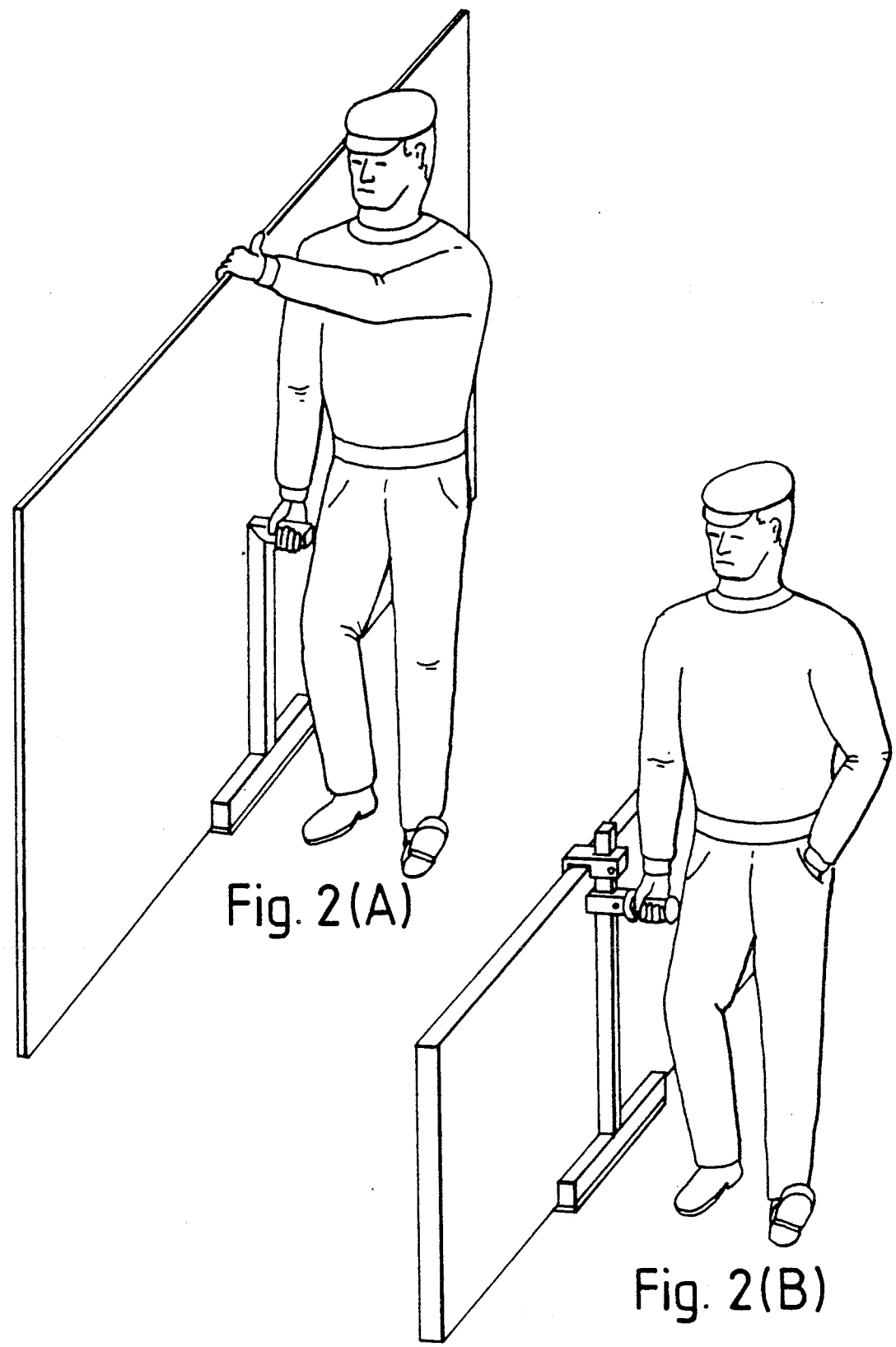

The tines 1 thus extend to the side away from the person and the board is supported to one side of the person in an upright position with its bottom edge substantially horizontal and extending backwards and forwards of the person. FIG. 2(A) illustrates the device being used to carry an 8'×4' (2.4 m × 1.2 m) sheet of wood in this manner. In view of the flexibility of a sheet of this size, it may be necessary to steady the top edge with one hand as shown. FIG. 2(B) illustrates the device being used to carry a door. In this case, the device is fitted with a clip for engaging the upper edge of the door as described below in relation to FIG. 3(D). A door mounted on the device in this way can be easily carried with one hand in the manner shown and can be easily maneuvered within the confines of a typical house.

The device may conveniently be made from hollow steel sections (one inch-2.5 cm-square) welded together with tines made from mild steel plate welded to the cross-piece. Typical dimensions of the device with reference to FIG. 1 are as follows:
  length of hand grip h: 5 inches (12.7 cm)
  length of stem s: 24 inches (61 cm)
  width of cross-piece c: 12 inches (30.5 cm)
  length of tines t: 4 inches (10 cm)

A number of modifications and optional or preferred features which may be added to the device are shown in FIGS. 3(A)–3(D).

FIG. 3(A) shows non-slip pads 6 which may be provided on the upper surfaces of the tines 1 and a further non-slip pad 7 which may be affixed to the stem 3 at a position towards the hand grip 4 so as to engage a board leaning towards the stem 3. These non-slip pads 6 and 7 are preferably ¼ inch (0.6 cm) thick rubber blocks or made of a suitable non-slip plastics material. With the use of such pads, it has been found that a board can be securely mounted on the device with a minimal angle of lean towards the stem 3. The use of such pads also provides protection for the board where it is supported by or engages the device.

A further optional feature (not shown) would be a suction pad provided in place of the non-slip pad 7. This could be used to provide securement of the board to minimize further the possible danger that it might overbalance and fall away from the stem 3. The suction pad might be a simple sucker against which the face of the board can be pressed or a more sophisticated design having a lever by which suctional engagement with the board can be established and released.

FIG. 3(A) also shows a stay 8 which enables the device to be left in a standing position with a board mounted thereon. The stay 8 is pivotably mounted on the stem 3 and preferably provided with an angled end so that it firmly engages the ground when in the extended position shown in FIG. 3A. The device is then supported with the stem 3 inclined by up to 20 degrees, but preferably about 10 degrees, to the vertical so that a board mounted thereon leans against the stem 3. Assuming that the board is not so tall as to topple over the top of the device, the stay 8 provides a simple and convenient means of propping up the device should the carrier wish to put it down without taking the board off it. The use of wheels on the device is avoided since these tend to make the device liable to move or roll away when this is not required.

FIG. 3(B) shows the device with a telescopic stem 3 which enables the length of the stem 3 to be adjusted. It also shows a hand grip 4 which comprises a moulded plastics grip rather than the plain handle as shown in previous Figures.

FIG. 3(C) shows an alternative means for adjusting the effective length of the stem 3 between the crosspiece 2 and the hand grip 4. In this case, the hand grip 4 is slidably mounted on the stem 3 and can be secured in a chosen position by a pinch-bolt 9 (see also FIG. 4).

FIG. 3(D) shows the device with an adjustable clip 10 which can be slid up and down the stem 3 and secured in a selected position by means of a pinch bolt. This can be used to fit over the upper edge of a board carried by the device, for instance if the device is of a size to accommodate the width of a standard 30 inch or 32 inch (76 cm or 81 cm) wide door. The door can then be supported with its long edge on the tines 1 and the clip 10 positioned over the opposite edge to secure the door to the device as shown in FIG. 2(B). The clip 10 may be used with either of the length adjustment means shown in FIGS. 3(B) and 3(C).

Figure 4:
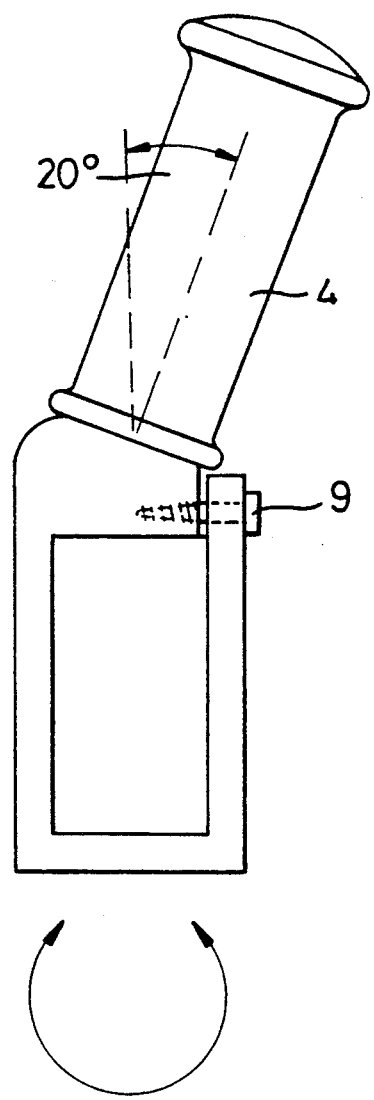

FIG. 4 is a plan view of an alternative form of hand grip 4. This is similar to the hand grip shown in FIGS. 3(B) to 3(D) except that the hand grip 4 is angled with respect to the bracket by which it is secured to the stem 3. It has been found that it is easier and more comfortable to carry the device if the hand grip is angled backwards by up to 45 degrees. An angle of about 20 degrees has been found most convenient. This makes it easier to grip the handle with the palm of the hand behind and passing under the handle with the knuckles facing downwards or backwards. The hand grip 4 shown in FIG. 4 can also be easily inverted so that it is angled backwards when the device is carried in the left hand rather than the right hand.

Figure 5A:
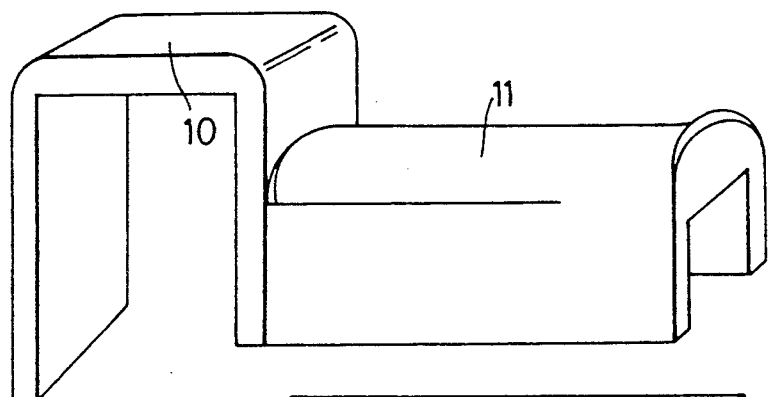
Figure 5B:
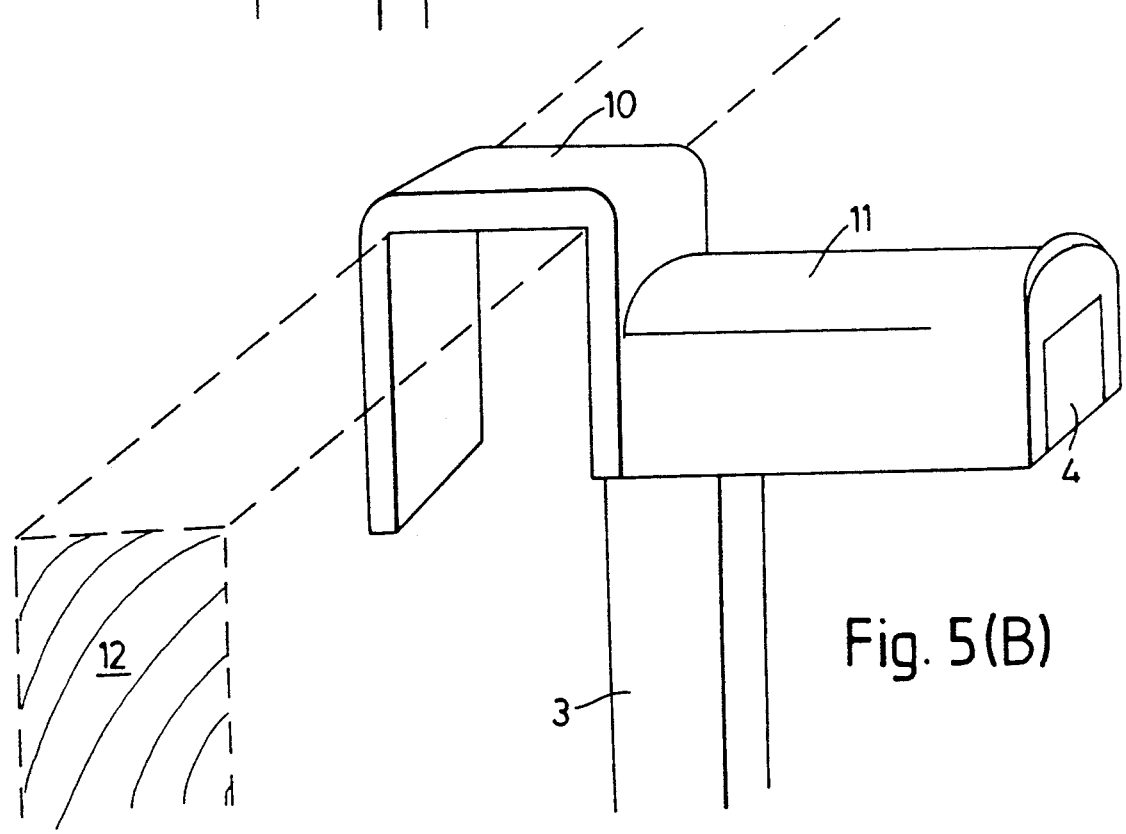

FIG. 5(A) shows an alternative form of clip 10 for fitting over the upper edge of a door mounted on the device. In this case, the clip 10 has a portion 11 which fits over a hand grip 4 of the type shown in FIG. 1 so that the clip 10 is held in place when the hand grip 4 is grasped in the hand. FIG. 5(B) is a partial side view showing the upper edge of a door 12 engaged by this type of clip 10.

Figures 6A, 6B:
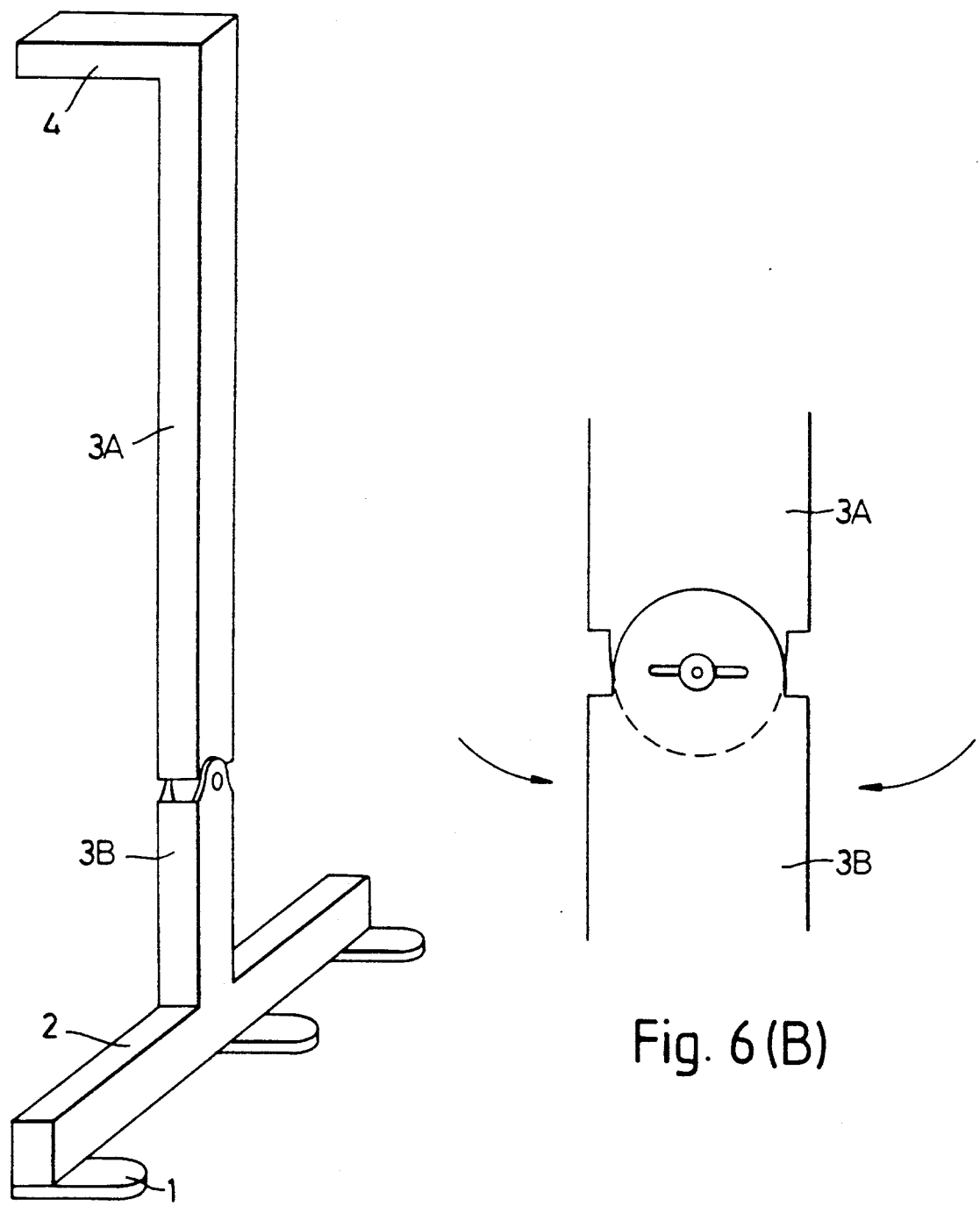
FIG. 6(A) is a perspective view of a device such as that shown in FIG. 1 with yet a further optional feature and FIG. 6(B) is an enlarged view of part of this device.
Figure 7:
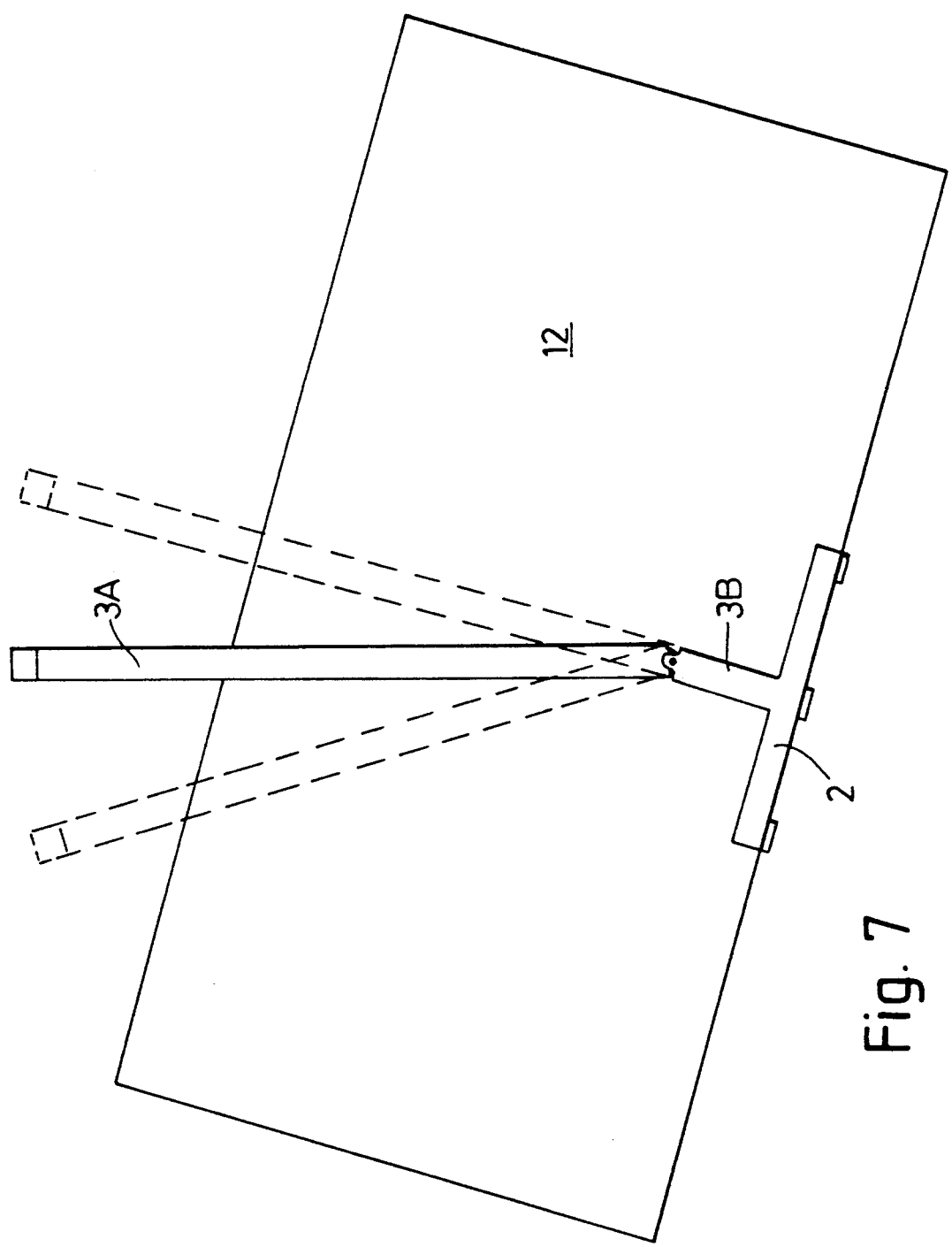
FIG. 7 illustrates the use of the device shown in FIG. 6 in carrying a door up a flight of stairs.

FIG. 6(A) shows a device with a swivel provided in the stem 3 to enable an upper portion 3A of the stem to be angled with respect to a lower portion 3B thereof. FIG. 6(B) is an enlarged view of the swivel provided in the stem 3. This swivel facility is useful, for instance, when carrying a door 12 up a flight of stairs as the upper portion 3A of the stem can be arranged to extend substantially vertically even though the lower portion is inclined due to the fact that the door 12 has to be inclined to carry it up the stairs. The use of the device in this situation is indicated in FIG. 7 which shows alternative positions of the upper portion 3A of the stem.

FIGS. 8(A) and 8(B) are side and front views of a preferred embodiment of the device. The device is similar to that shown in FIG. 1 but is also provided with a lockable foot mechanism which may be extended from the base of the device for engaging the ground and supporting the remainder of the device in a raised position. This is especially useful for holding a door in place while it is being fitted within a door frame.

The foot mechanism comprises a foot 13 having a central portion 13A and tines 13B at its ends. These tines 13B are arranged to fit between the tines 1 of the device as shown in FIG. 11(A). They may also extend in both directions from the central portion 13A as shown in FIG. 11(B). The foot 13 is connected to a mechanism (described below with reference to FIGS. 10(A) and 10(B)) which enables it to be raised and lowered with respect to the remainder of the device. A button 14 is provided near the hand grip 4 for lowering the foot 13. When the botton 14 is released, the mechanism is automatically locked to prevent the foot 13 from rising or the device from lowering. A lever 15 is provided to release the mechanism to enable the foot 13 to be raised again or the device lowered. Similar buttons 16 and levers 17 may also be provided on the crosspiece 2 for operation by the carrier's foot to secure the foot 13 in position, especially when it is inclined to the remainder of the device (see FIG. 10 and description below).

Figure 9A:
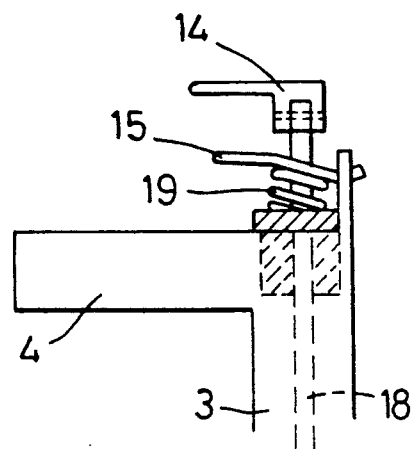

FIG. 9(A) shows the button 14 and lever 15 in more detail. The button 14 is connected to a shaft 18 which passes through the lever 15 and down within the stem 3 of the device. By pushing the button 14 downwards, the shaft 18 is pushed down within the stem 3 and lowers the foot 13. When the button 14 is released, the shaft 18 is locked by the lever 15 which is pushed into frictional engagement with the shaft 18 by a coil spring 19. This prevents the shaft 18 from rising with respect to the stem 3. When the lever 15 is pushed down against the spring 19, the shaft 18 can again be raised or lowered with respect to the stem 3. The frictional engagement between the shaft 18 and lever 15 is simply provided by a hole within the lever through which the shaft passes. When the axis of the hole is inclined to the axis of the shaft 18 (as shown in FIG. 9(A)), the edges of the hole engage the shaft. However, when the lever 15 is pushed down, the axis of the hole is aligned with the axis of the shaft so the shaft may freely slide within the hole. As shown in FIG. 10(A), the button and lever mechanism provided on the cross-piece 2 are of similar design to that shown in FIG. 9(A).

Figure 9B:
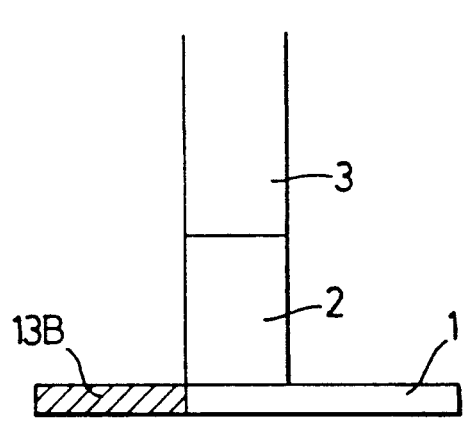
Figure 9C:
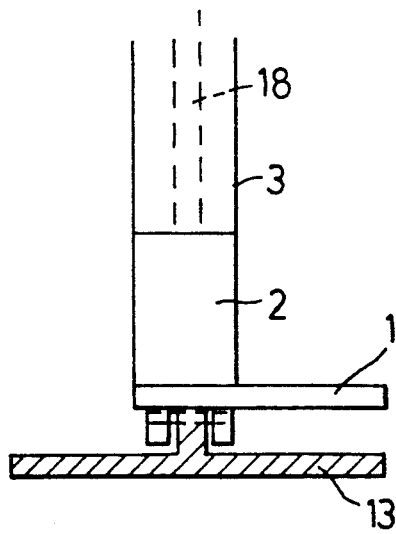

FIG. 9(B) is a side view of the device showing both tines 1 and tines 13B resting on the ground. When the button 14 is pressed and the device lifted by the hand grip 4, the device may be lifted above the foot 13 as shown in FIG. 9(C).

The foot mechanism is also preferably provided with a swivel enabling the foot 13 to be inclined to the cross-piece 2 of the device as shown in FIG. 10. FIG. 11(B) shows an exploded view of the swivel mechanism. The lower end of the shaft 18 is connected to a top plate 20. A lower plate 21 is provided on the central portion 13A of the foot for fitting within the lower end of the stem 3 as shown in FIG. 10. The top and lower plates 20 and 21 are sandwiched between two side plates 22 and connected thereto by a pair of pivot pins 23. A front view of the assembled swivel mechanism is shown in FIG. 10. The foot 13 can be held in an inclined position with respect to the cross-piece 2 by means of the button 16 and lever mechanisms 17 as illustrated in FIG. 10.

The use of the foot mechanism is best illustrated with reference to the fitting of a door within a door frame. The sides of the door are first trimmed to the required size and the door is then mounted in an upright position on the device and positioned, using the device, into the door frame in the closed position as shown in FIG. 12(A). The door is then lifted by lifting the device until the top of the door engages the top door jamb. The button 14 is then pressed to lower the foot 13 to the floor. When the button 14 is released, the foot 13 rests on the floor and the remainder of the device with the door mounted thereon is held clear of the floor. The gaps between the sides of the door and the door frame are then checked to see that they are even. The foot 13 is then locked in position by pressing the foot buttons 16. It will be appreciated that since the foot 13 is able to swivel relative to the remainder of the device, the door can be held in a substantially vertical position even if the floor on which the foot 13 is resting is not horizontal (a common occurrence in older houses), i.e., the height of the two edges of the door can be adjusted independently so the door can, if required, be held at an angle to the vertical. The door is then held in position by the device leaving both hands of the carpenter free to mark the top of the door with a straight edge to show how much wood needs to be trimmed off in order to make a good fit within the door frame. The door can be then lowered by pressing the levers 15 and 17 to release the foot mechanism so that it can be removed for trimming (at the site of the door frame).

When the top and bottom edges of the door have been trimmed to size, the device may be used to hold the door in an open position within the door frame to enable hinges to be fitted as shown in FIG. 12(B). The corner of the door adjacent the top hinge can be held in one hand while a screw is fitted to hold the hinge in place. The door is then held in place by the device and this hinge even when the floor beneath the door is not level so two hands can be used to fit the remaining screws to the top and bottom hinges. It will be appreciated that as the door is held securely by the device and is held at the correct height and angle with respect to the ground, the carpenter has both hands free to fit the hinges, so making this a much easier job to carry out than it would be without the device. As the device supports the door from beneath it does not interfere with the positioning of the door within the door frame and can be used to support doors hung on either the left or right side. The device can also be used when removing or re-fitting an existing door. The device is used to hold the door in place to prevent it swinging and so avoids the danger of the door pulling the hinges away from the door frame as they are being removed or re-fitted.

Other mechanisms for raising and lowering the foot 13 and releasably securing it in position in place of that described above and shown in the drawings will be apparent to those skilled in the art.

I claim:
1. A hand-held device having a lower end and an upper end for lifting and carrying a door and for fitting a door within a door frame, the device comprising:
   support means for placing under an edge of a door, the support means having spaced apart portions for stably supporting the door either side of its centre of gravity;
   a body portion attached to the support means and extending upwardly therefrom;
   a handle portion attached to the body portion at a position spaced from the support means for gripping and lifting the device by hand; and
   a foot mechanism having a foot portion which may be extended from a lower end of the device to engage the ground and holding means for releasably holding the device in a stable raised position on the extended foot portion and at a desired height and a desired angle, in the plane of the door, with respect to the ground, wherein the height and the angle of the support means relative to the ground, when the device is at least substantially vertically aligned, are infinitely variable,
   whereby a door may be lifted and carried with one edge resting on the support means and one face leaning against part of the body portion, the handle portion being positioned such that the handle portion can be freely gripped to lift the device without interference from the door supported thereon, and whereby a door positioned upright on the device may be fitted within a door frame and stably supported in a raised position above the ground at a desired angle thereto to facilitate securement of the door within the door frame.
2. A device as claimed in 1 in which the support means comprises a plurality of tines on which an edge of a door to be lifted can be supported.
3. A device as claimed in claim 1 in which the body portion comprises a stem with a cross-piece connected to a lower end thereof, the support means being secured to the cross-piece and the handle portion being secured adjacent an upper end of the stem.

4. A device as claimed in claim 1 in which the handle portion comprises a hand grip projecting from an upper portion of the body portion.

5. A device as claimed in claim 1 in which the support means comprises a plurality of tines on which an edge of a board to be lifted can be supported, the body portion comprises a stem with a cross-piece connected to the lower end thereof, the support means being secured to the cross-piece and the handle portion being attached adjacent the upper end of the stem, the handle portion comprises a hand grip projection from an upper portion of the body portion, and the tines project from the cross-piece in one direction and the hand grip projects from the stem in the opposite direction.

6. A device as claimed in claim 5 in which the hand grip is removably attached to the stem and arranged so that it can be fitted thereto so as to be inclined either forwards or backwards with respect to the said opposite direction.

7. A device as claimed in claim 1 in which a non-slip surface is provided on the support means for engaging the edge of a board mounted thereon.

8. A device as claimed in claim 1 in which a non-slip surface is provided on the body portion for engaging the face of a board mounted thereon.

9. A device as claimed in claim 1 comprising a support leg pivotably connected to the body portion.

10. A device as claimed in claim 9 in which the leg is arranged to support the device when placed on the ground in a position inclined by up to 20 degrees with the vertical.

11. A device as claimed in claim 1 comprising adjustment means for adjusting the spacing between the support means and the handle portion.

12. A device as claimed in claim 1 in which the handle portion is slidably mounted on the body portion and can be releasably attached thereto.

13. A device as claimed in claim 1 comprising a clip for engaging the upper edge of a board mounted on the device.

14. A device as claimed in claim 1 in which control means are provided adjacent the handle portion for lowering the foot portion and releasably securing the foot portion in a lowered position.

15. A device as claimed in claim 1 in which the foot mechanism is provided with a swivel to allow the foot portion to rest on an inclined surface whilst the support means remains in a substantially horizontal position.

* * * * *